Feb. 14, 1967 A. M. KING 3,304,406
INFRARED OVEN FOR HEATING FOOD IN PACKAGES
Filed Aug. 14, 1963 4 Sheets-Sheet 1

Inventor
Alan M. King
By Hofgren, Wegner, Allen, Stellman & McCord
Attorneys

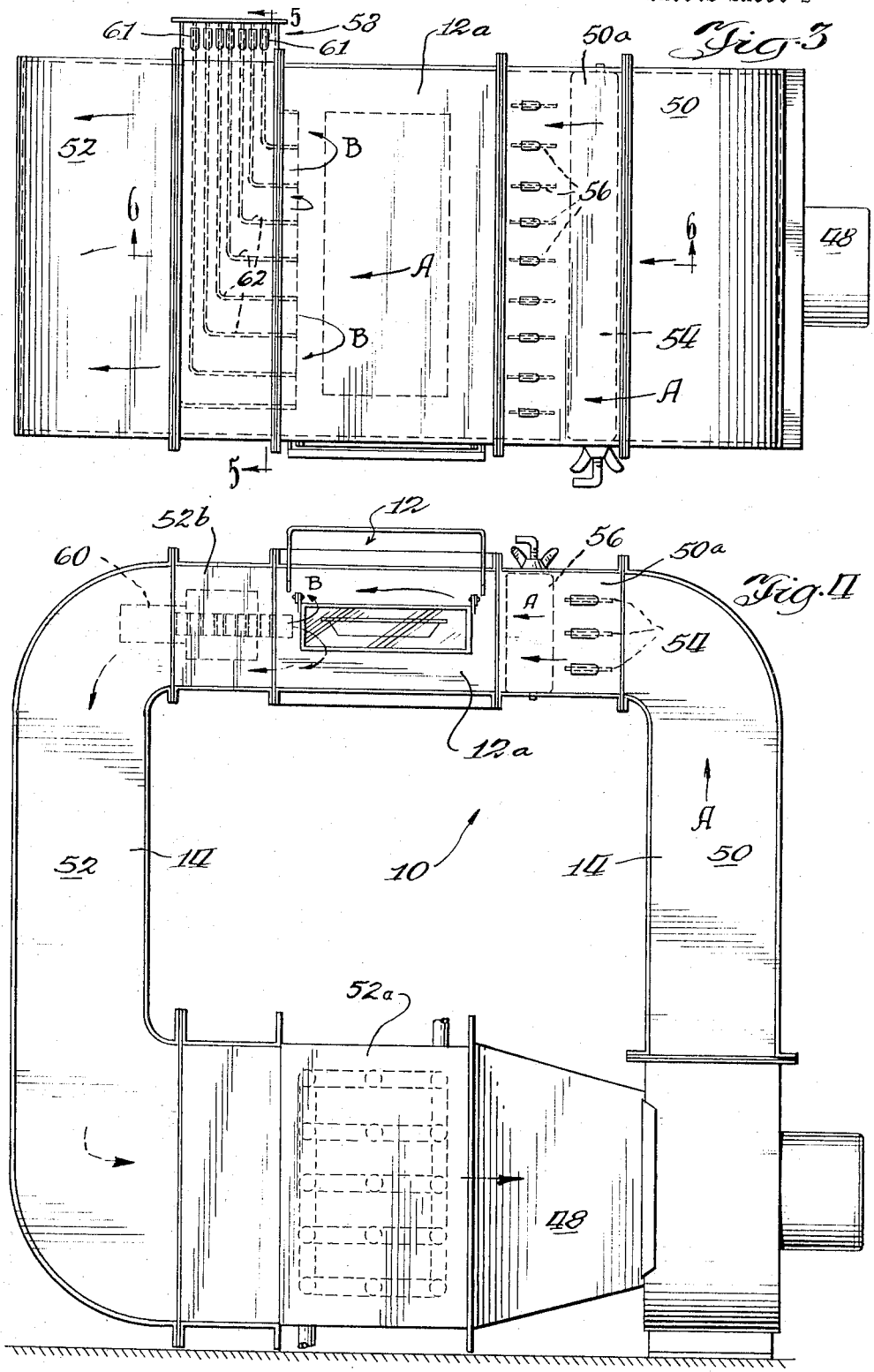

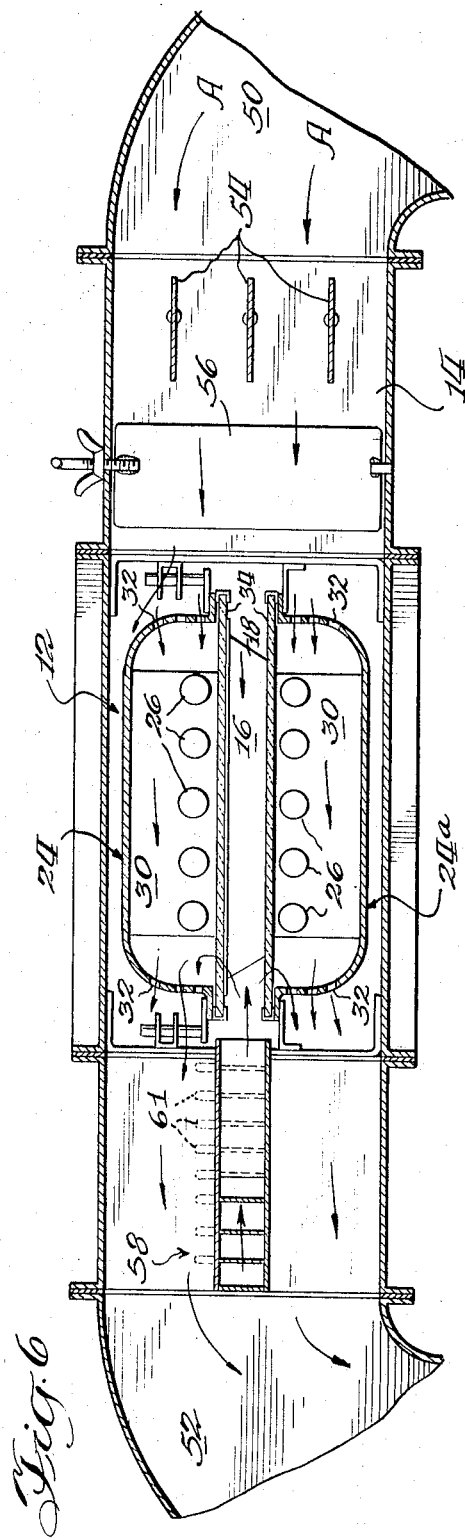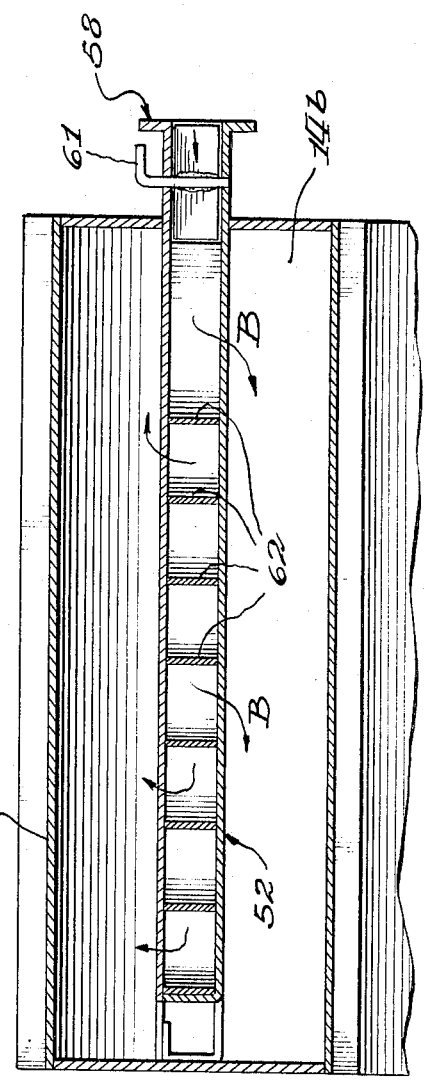

Feb. 14, 1967   A. M. KING   3,304,406
INFRARED OVEN FOR HEATING FOOD IN PACKAGES
Filed Aug. 14, 1963   4 Sheets-Sheet 4

United States Patent Office
3,304,406
Patented Feb. 14, 1967

3,304,406
INFRARED OVEN FOR HEATING FOOD IN PACKAGES
Alan M. King, Lake Forest, Ill., assignor to Square Manufacturing Company, a corporation of Illinois
Filed Aug. 14, 1963, Ser. No. 302,203
8 Claims. (Cl. 219—411)

This invention relates to an oven and more particularly to an oven adapted for rapid heating of frozen articles of pre-cooked food.

With the advent of automated cafeterias wherein a customer may select an individual dinner to be prepared while he selects the appropriate drink, salad and dessert for consumption therewith, it has become desirous to develop means for quickly heating and preparing an individually selected dinner. One means of solving the problem has been to use prepackaged dinners which are maintained in a frozen condition until selected by a consumer, at which time the food is heated. However, to avoid unnecessary delay it is further desirable that the hot meal be presented to the consumer at approximately the same time that he completes his selection of the appropriate drink, salad and dessert to be consumed with the meal. It is therefore necessary that the food be rapidly heated within a time limit of one to two minutes.

In order to heat these prepackaged articles of frozen food in such a short span of time it is necessary that a large amount of energy be applied thereto. With the application of such relatively high concentration of energy it was found that often times uneven temperatures will occur in the oven due to poor distribution of the air surrounding the heating area. Since the frozen food is usually maintained in a heat-resistant plastic container during the heating process, it is necessary to keep the container from burning. As the frozen food is heated, pressure builds up inside the container and the top thereof tends to draw away or "blow up" from the food. When this occurs, the container top will burn since it is no longer in contact with the cold food, thereby possibly leaving a distasteful or unsanitary residue on the food or heating apparatus. If the top is maintained flat in contact with the food it will tend to heat at the same rate as the food in the container and therefore be prevented from distorting, scorching or burning. However, if the top is maintained in contact with the food, there must be another means provided to permit expanding air and steam to escape from the container.

Furthermore, the equipment itself must be capable of withstanding the high degrees of heat imparted thereby. In order to assist the equipment in withstanding the high degrees of heat the general remedy has been to subject the equipment to a flow of air at a high velocity. However, unidirectional flow of air creates certain areas of partial vacuum or, at least, reduced air flow, thereby creating a possible area of heat build-up contributing to the deterioration of the heating unit and possibly to uneven heating of the food in the containers.

It is therefore a primary object of this invention to provide a new and improved oven for heating frozen articles of food.

It is another object of this invention to provide a new and improved oven for heating frozen articles of food which is free from the objections mentioned above.

It is still another object of this invention to provide a new and improved oven for heating frozen articles of food which is capable of heating such frozen food rapidly without damage to the heating equipment.

It is yet another object of this invention to provide a new and improved oven for heating frozen articles of food in plastic-like containers having means for subjecting the containers and food to high degrees of heat while preventing charring or burning of the container.

It is a further object of this invention to provide a new and improved oven for heating frozen articles of food in containers having means for ventilating the heating unit and frozen foods to permit even distribution of heat and even heating of the food.

It is still a further object of this invention to provide a new and improved method for heating frozen articles of food in containers.

Further objects and advantages will become apparent from the following detailed description taken in connection with the accompanying drawings, in which:

FIGURE 3 is a top plan view of the oven of this invention;

FIGURE 4 is a side elevational view of the oven of this invention;

FIGURE 5 is an enlarged fragmentary section view of a portion of the oven shown in FIGURE 4 illustrating in greater detail the heating station area thereof;

FIGURE 6 is an enlarged section view taken along the line 6—6 of FIGURE 3;

Figure 1:
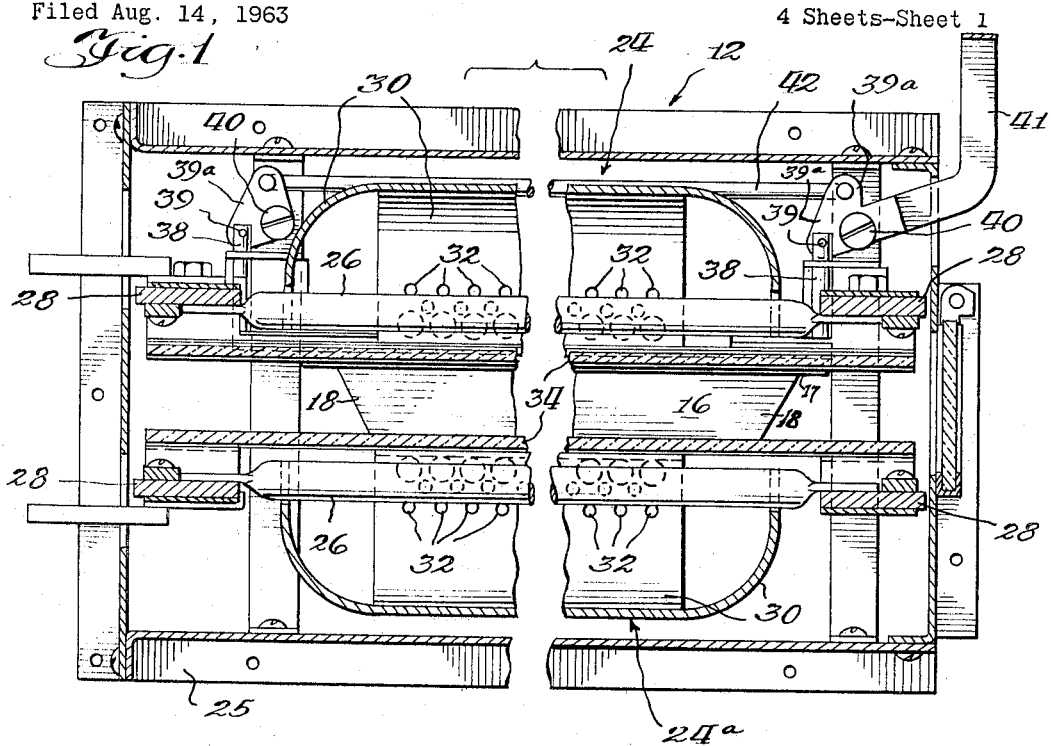
FIGURE 1 is a broken view in transverse section of the heating unit of this invention.
Figure 2:
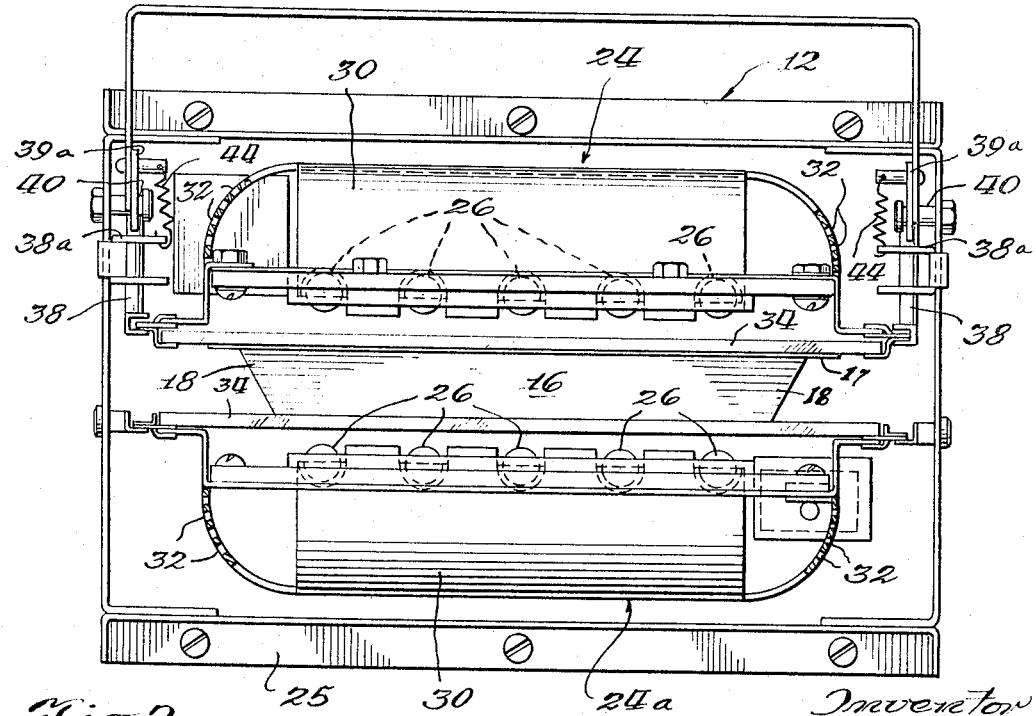
FIGURE 2 is a front elevational view, partially in section, of the heating unit of this invention.
Figure 7:
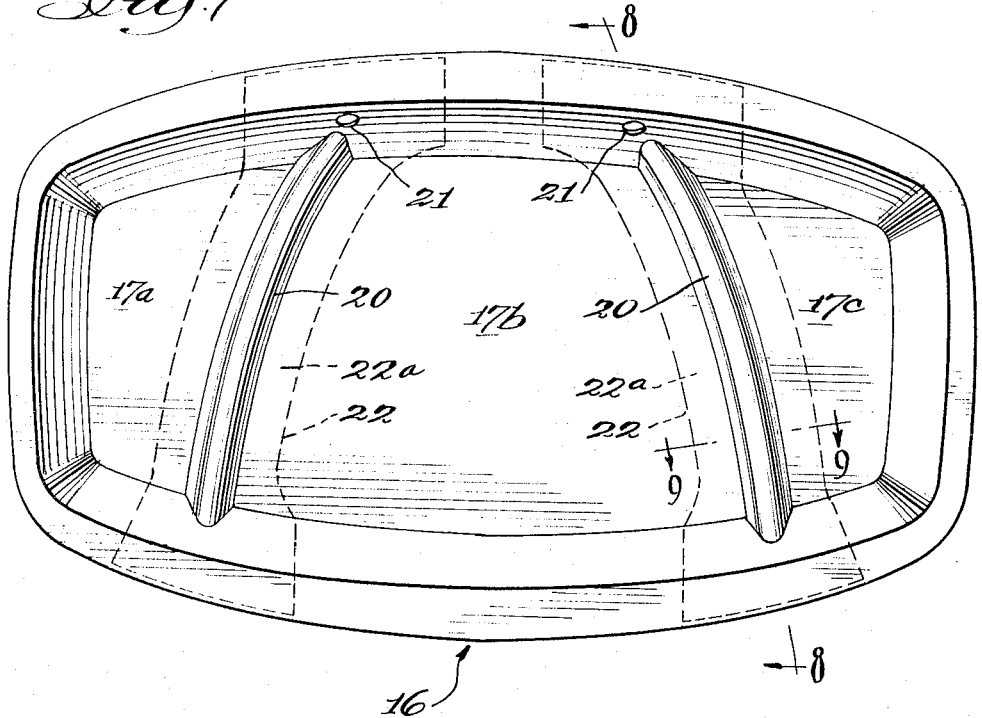
FIGURE 7 is a top plan view of a food package for use with the oven of this invention.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in FIGURE 4, the oven 10 of this invention generally includes a heating unit 12 positioned at a heating station 12a intermediate portions of duct work 14. The heating unit 12 is adapted to heat frozen food in a container 16 in a relatively short period of time, in the order of one to two minutes. Thus such an oven as disclosed in this invention would be ideally suited for use in an automatic cafeteria wherein the customer, upon selection of an appropriate dinner, may receive an individually packaged, freshly heated meal.

The container 16 is preferably a box-like structure having a top 17 and circumsurrounding flanged side walls 18 and a bottom 19 for adequately encasing the food therein. It has been found that certain polyester resins of the trade name "Tenite" or "Mylar" are particularly suited for this purpose in that they are capable of withstanding high degrees of heat. Preferably the top is a relatively thin sheet of the aforementioned material as opposed to the thicker circumsurrounding side walls, so that the customer may remove the top from the container upon receipt of the same and use the remaining portion of the container as a dish from which the food may be consumed.

Figure 8:
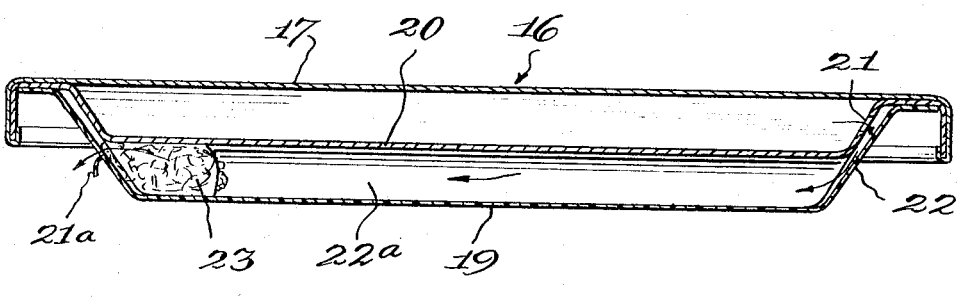
FIGURE 8 is a section view of the food package taken along the line 8—8 of FIGURE 7.
Figure 9:
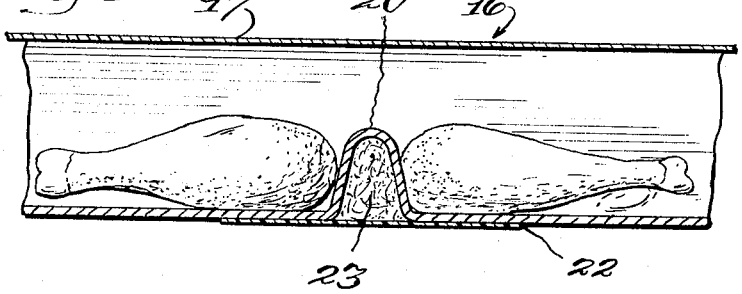

Hollow ridges, such as 20, may be formed to compartmentalize the container into separate food compartments 17a, 17b and 17c. A small opening is formed in each ridge near the side wall to provide a vent hole 21 for the expanding air and steam produced in the high speed heating. The bottoms and sides of the ridges are enclosed with a suitable material 22 such as Mylar, or cellophane or the like to form a passage 22a. An outlet vent 21a is formed in the side wall of cellophane opposite from the inlet vent. Suitable filtering means 23, such as cotton, is positioned in the passage adjacent the outlet vent to filter out food particles which might be in the steam, such as gravy or juices. Preferably, the container is placed at the heating station so that the outlet vent 21a is on the side thereof opposite the direction of the main flow as indicated by the arrow A. This positioning of the container relative to the main air flow aids in creating a vacuum or suction which helps to pull the steam and expanding air out of the container in a manner indicated by the arrows shown in the container in FIGURE 8.

The heating unit 12 includes top and bottom heating components 24 and 24a, respectively, and a frame 25 which supports the components of the heating unit in a conventional fashion through the use of appropriate fastening means. Included in each component and providing the means for the source of heat are a plurality of infrared tubes 26 adapted to be positioned closely adjacent to the top and bottom of the container and secured to the frame in terminals 28 at either end. The infrared tubes are electrically connected to an appropriate source of electrical power and when actuated in a known fashion emit a plurality of light rays, predominantly infrared energy, which, when absorbed, produces heat in the absorbing articles. Dependent upon the individual power of each infrared tube and the combined number of such tubes, a unit may be constructed which will be capable of producing great quantities of heat in an article which absorbs the rays. In the preferred embodiment there are shown five infrared tubes in both the top and bottom components of the heating unit, which tubes are capable of producing a sufficient quantity of heat to thoroughly heat a dinner held in the container 16, which is of a size commensurate with typical frozen dinners, in the relatively short order of one to two minutes.

Mounted above and below, or behind the infrared tubes of the top and bottom components of the heating unit, respectively, are the reflectors 30 which are substantially tray-shaped structures of highly reflective aluminum or the like and are adapted to reflect the light and heat of the infrared tubes and concentrate the same on the food container held therebetween. The reflectors are provided with a plurality of openings in the side wall thereof to permit the passage of air therethrough for ventilating the heating unit in a manner to be described later.

Also secured to each of the top and bottom components of the heating unit is a heat resistant glass plate or pressure member 34. The plates 34 are secured to the interior of either the components between the infrared tubes and a food container and in closely spaced parallel relationship to each other for embracing a food container 16 in facial juxtaposition therebetween. The plates permit the transmission of the infrared rays therethrough without being substantially affected thereby. A function of either glass plate is to maintain the cover and/or the bottom of the container close to the frozen food in the container so that they will heat at an even rate and will not be burned or scorched.

The top component of the heating unit is adapted for relative vertical movement permitting it to receive the container and clamp thereover so that the heating unit may closely embrace the same between the glass plates thereof. The lateral extremities of the top component are secured at the four corners thereof to an upright post 38 which is mounted for vertical movement in appropriate bushings 38a which are secured to the frame. Each post is pivotally mounted at 39 to the linkage 39a which is pivotally mounted at 40 to the frame. A handle 41 is secured to each of pivotal mountings 40 at one end, and is operably associated with the linkage at the other end by tie rods 42 secured therebetween, so that raising and lowering of the handle to swing it about its pivotal mounting 40 and thereby swing the linkage will cause raising and lowering of the post and thereby the top component. This action is so designed as to provide a toggle action, locked in the down position. The spring 44 is secured at one end to each linkage component and at the other end to the frame bushing to normally urge the top units downward or toward the bottom unit. Thus after the top unit has been raised to insert a container thereunder, the top unit will lower with the glass plate in facial juxtaposition with the top of the container under the influence of the spring 44.

Further included in the oven of this invention is a blower or impeller means 48 which is situated at one end of the duct work 14 for supplying a flow of air therethrough. The impeller means 48 is positioned adjacent the intake duct 50 for supplying a flow of air indicated by the arrows A to the heating station 12a for ventilation thereof. This air is carried away therefrom by the exhaust duct 52 which is positioned opposite the intake duct and carries away the flow of air to a heat exchanger means 52a where it is cooled for recirculation. Positioned immediately adjacent the heating station from the intake side thereof is a flow control chamber 50a having vertical main flow louvers 54 and horizontal main flow louvers 56 pivotally mounted therein for appropriately deflecting the main flow of air therethrough for most effective ventilation of the heating station 12a.

A secondary flow duct 58 is positioned on the opposite side of the heating station. A smaller intake fan or impeller 60 similar to the fan 48 is associated with duct 58 for supplying a secondary flow of air. The secondary flow duct has a plurality of horizontal secondary flow louvers 61 positioned at the intake area of the secondary baffles 62 for regulating the flow of secondary air, indicated by the arrows B, therethrough. As the flow of air reaches the heating station some of it passes through the openings 32 into the interior of the reflectors to ventilate that portion of the heating units while some other portions of the flow duct are directed around the food containers 16 encouraging even heating of the food. However, the unidirectional flow of air would tend to leave an uneven area of heat distribution at the "exhaust" side of the heating units and food container. Thus the equipment in this area could become damaged by the excessive build-up of heat and, on occasion, the food container might also be burned on the "exhaust" side. It has been found that by supplying the secondary flow of air in the direction opposite the main flow of air that both the heating unit and food container are adequately circumsurrounded by ventilating air flow to permit even heating of the frozen food in the containers and adequate ventilation of the containers and heating components themselves.

The oven of this invention provides a means for rapid heating of frozen food in containers which are adapted to permit the even heating of the food to prevent burning thereof. This oven provides means for adequately ventilating the heating portion of the heating unit to prevent damage thereto. Moreover, this oven provides a means for preventing the top plastic cover of the food container from being burned by maintaining the same in facial juxtaposition with the frozen food in the container. Thus with the oven of this invention frozen foods may be kept in suitable plastic containers for long durations of time and removed from a frozen storage and heated in response to customer solicitation in rapid time to provide the customer with an individually prepared, freshly heated meal.

I claim:

1. An apparatus for heating frozen food in an infrared transmissive container having a bottom, side walls, and an expansible top portion relatively less substantial than the remainder of said container, comprising: a heating station having means for producing heat adjacent said container, said means for producing heat including a plurality of spaced infrared lights; a first supporting member at said heating station for supporting said container bottom; a second covering member at said heating station constructed and arranged to be positioned in facial juxtaposition with the expansible portion of said container to thereby maintain the container top and bottom in contact with the frozen food being heated in the container while the remaining surfaces of the container remain freely exposed, said first and second members adapted to transmit the infrared rays from said infrared lights without undue heating so that said container top and bottom will be maintained adjacent said food by said first and second members and be prevented from burning in response to said infrared rays and means for forcibly circulating cooling air around the exposed container surfaces and supporting and covering members to maintain the container and members below container charring temperatures.

2. An apparatus for heating frozen food in an infrared transmissive container having a top thereover, comprising: a heating station having means for producing heat adjacent said container, said means for producing heat including a plurality of infrared lights; reflector means adjacent to said infrared lights for reflecting and concentrating the rays transmitted by said infrared lights into said frozen food, said reflector means having a plurality of openings to permit the passage of air therethrough; heat resistant plates at said heating station between said infrared lights and arranged to facially engage the container top and bottom to maintain the container top and bottom in contact with the said plates, said plates adapted to transmit the infrared rays from said lights without undue heating of the same so that the container top and bottom may be maintained in contact with the frozen food in said container to prevent burning of the container or the food therein while the remaining surfaces of the container remain freely exposed; first means for producing a first forced flow of air; first means for directing a portion of said first forced flow of air to said container in one direction; second means for producing a second forced flow of air; and second means for directing a portion of said second forced flow of air to said container in a direction opposite said first forced flow of air so that said container and said heating station are subjected to opposed currents of forced ventilating air.

3. The apparatus of claim 2 wherein the heating station is positioned in an enclosed chamber utilized for conducting the first and second forced flow of air to the heating station, the sides of the heating station being open to the chamber so that air can be forced into the heating station from the opposite sides, the heating station being further constructed and arranged so that the sides of a container held between the plates are open and exposed to the opposed forced flow of air.

4. In combination, a heating station for heating frozen food, comprising: a relatively shallow frozen food package having substantially parallel top and bottom panels highly transmissive of infrared rays; a heating station including infrared heater means and generally parallel infrared transmissive pressure members, said pressure members constructed and arranged to maintain the top and bottom package panels in heat transfer contact with the food in the package when the package is placed between the pressure members; and means for forcibly circulating cooling air around the package and pressure members to maintain the members and package below package charring temperatures.

5. The heating station of claim 4 wherein said infrared heater means comprises spaced infrared heaters, said infrared transmissive pressure members being positioned between said infrared heaters.

6. The heating station of claim 4 wherein said means for forcibly circulating cooling air around the package and pressure members includes first means for producing a first forced flow of air; first means for directing a portion of said first forced flow of air to said package in one direction; second means for producing a second forced flow of air; and second means for directing a portion of said second flow of air to said container in a direction opposite said first flow of air so that said container and said heating station are subjected to opposed currents of forced ventilating air.

7. The heating station of claim 4 wherein one of the pressure members is mounted for movement between a first package clamping position wherein the package panels are held in heat transfer contact with the food in the package, and a second position spaced from the package permitting removal of the package from the station.

8. The heating station of claim 4 wherein the heating station is positioned in an enclosed chamber utilized for conducting the first and second forced flow of air to the heating station, the sides of the heating station being open to the chamber so that air can be forced into the heating station from the opposite sides, the heating station being further constructed and arranged so that the sides of a container held between the plate are open and exposed to the opposed forced flow of air.

References Cited by the Examiner

UNITED STATES PATENTS

| 1,753,879 | 4/1930 | Carter et al. | 99—389 X |
| 1,777,208 | 9/1930 | Lassen | 99—369 |
| 2,043,601 | 6/1936 | Widemuller | 219—400 |
| 2,490,076 | 12/1949 | Maxson | 219—370 |
| 2,614,480 | 10/1952 | Elmer | 99—349 X |
| 2,824,943 | 2/1958 | Laughlin | 219—411 |
| 2,864,932 | 12/1958 | Forrer | 219—400 X |
| 2,957,067 | 10/1960 | Scofield | 219—400 |
| 3,122,990 | 3/1964 | Fried | 99—369 |

FOREIGN PATENTS

| 79,844 | 5/1919 | Switzerland. |

RICHARD M. WOOD, *Primary Examiner.*

R. F. STAUBLY, *Assistant Examiner.*